United States Patent Office 2,709,295
Patented May 31, 1955

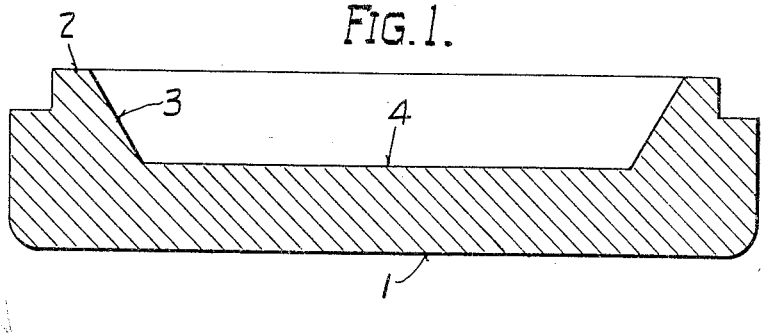
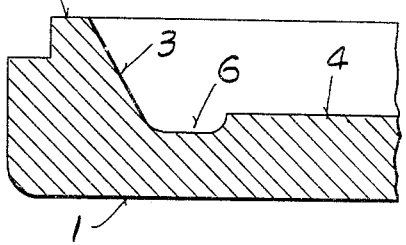
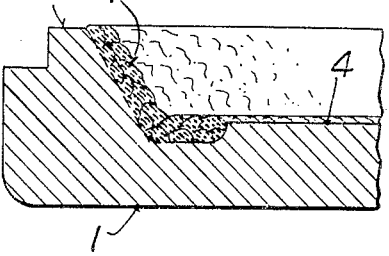
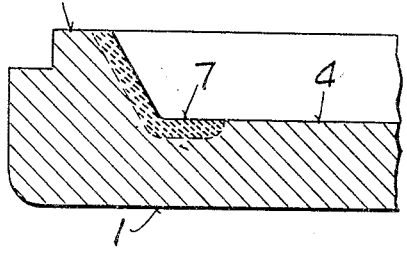
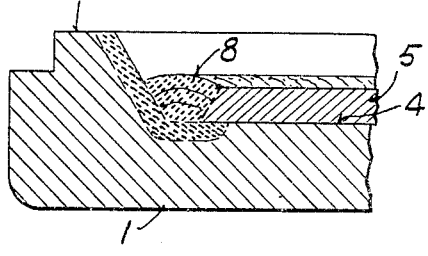
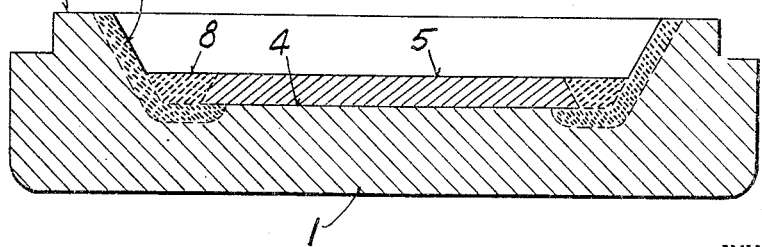

2,709,295
COPPER-LINED FERROUS ARTICLE

John J. Chyle, Wauwatosa, Wis., assignor to A. O. Smith Corporation, Milwaukee, Wis., a corporation of New York Application May 18, 1951, Serial No. 227,085

1 Claim. (Cl. 29—196.3)

This invention relates to a copper-lined ferrous article.

In the manufacture of lined vessels such as are utilized to contain corrosive fluids at high temperatures and pressures the liners selected are frequently composed of pure copper or an alloy thereof, for example phosphorous deoxidized copper. The making of a corrosion resistant fusion weld between such a liner and the carbon steel shell of the vessel necessitates the use of copper weld metal, which has caused considerable difficulty in that copper penetrators almost invariably form along the grain boundaries of the carbon steel. These penetrators not only weaken the carbon steel shell, with consequent danger of rupture at high pressures, but also cause cracks which may impair the fluid tightness of the vessel and circulation of contained fluid behind the lines with disastrous results to the carbon steel and rupture of the liner.

One object of the present invention is to produce a copper-lined vessel shell without causing the formation of penetrators and with no impairment in the strength or corrosion resistance of the vessel.

The invention, in general, comprises casting, preferably by electric arc fusion, an inlay of nickel or an alloy having a high nickel content along the proposed joint between the ferrous base member and the copper lining therefor. After suitable preparation of the inlay by peening and machining, the copper liner material is placed in position and a fusion weld is made to join the liner with the inlay. In order to maintain the corrosion resistance of the vessel at a uniform level throughout, the filler metal employed in making this weld is of a composition which is substantially the same as that of the copper lining material.

Other objects and advantages of the invention will be set forth more fully in the following description of the embodiment of the invention illustrated in the accompanying drawings.

In the drawings:

Figure 1 is a cross sectional view of the base portion of a disc shaped vessel cover to be lined in accordance with the invention;

Fig. 2 is a fragmentary view corresponding to Fig. 1 and showing the cover base after the first machining operation;

Fig. 3 illustrates the base after an inlay has been cast thereon in the next step of the method of the invention;

Fig. 4 shows the base after the second machining operation;

Fig. 5 illustrates the vessel cover after the lining has been placed in position and an arc weld made between the lining and the inlay; and, Fig. 6 represents the completed vessel cover, after the arc weld has been ground or machined flush with the liner.

Referring to the drawings, the invention is illustrated as employed in the lining of a disc-shaped base member 1 to form a cover for a lined vessel, not shown. The method of the invention, however, is used not only in lining the cover base 1 but in all cases where it is desired to secure the liner of the vessel to the shell thereof.

The base 1 is composed of carbon steel and is shown as shaped with a raised annular sealing flange 2 having a bevelled inner face 3 encompassing a flat surface 4. A liner disc 5, having its rim bevelled correspondingly to face 3, is adapted to be welded in position on the surface 4 in order to protect the same from the corrosive effects of fluids contained within the vessel.

Because of the particular type of fluid which it is desired to store in the vessel, the liner disc 5 and the filler metal employed in welding the same in position are composed of pure copper or an alloy thereof. Deoxidized copper, and more particularly phosphorous deoxidized copper, is most frequently used as the liner material.

In order to prevent the formation of penetrators into the carbon steel when the disc 5 is welded in place, the first step in the method of the invention comprises machining or grinding a shallow groove 6 (Fig. 2) around the periphery of surface 4. The width of groove 6 is such that a portion thereof underlies the outer edge of the liner disc when the disc is placed in position.

As the next step, shown in Fig. 3, a metal inlay or insert 7 is cast in the groove 6 and also along the entire inner face 3 of sealing flange 2. In depositing the insert 7, electric arc fusion is preferably employed, with the insert metal forming one electrode as in the case of ordinary arc welding. Although two layers of inlay beads 8 are shown in Fig. 3, one layer may be adequate where the beads are of sufficient depth.

The composition of the inlay metal is of critical importance. For example, such metals as stainless steel have been found ineffectual in the prevention of cracking. A copper inlay, although desirable in the prevention of dilution of the copper weld metal used in securing the liner disc 5 in place, is totally inoperative to prevent cracking since the effect of the inlay on the carbon steel would be as undesirable as the effect of the weld metal itself.

According to the invention, the inlay or insert 7 is composed either of an alloy having a high nickel content or of substantially pure nickel. An alloy comprising essentially sixty-seven percent nickel and thirty percent copper, and having the trade name Monel, has been found to be particularly satisfactory.

After the insert has been cast in position, the surface thereof is peened to work the metal and thereafter machined to a contour (Fig. 4) corresponding to the shape of base member 1 prior to the cutting of groove 6. The liner disc 5 is then positioned on surface 4 preparatory to welding.

As shown in Fig. 5, a multi-pass fusion weld 8 is then made in the gap between the bevelled edge of disc 5 and the bevelled face of the insert 7. In making this weld, the inert gas shielded arc process is employed with a filler rod of substantially the same composition as that of the liner disc. The presence of the inlay metal beneath the weld and also beneath the edge of disc 5 insures that no copper will penetrate into the carbon steel base 1 to cause the undesirable effects previously mentioned.

As the final step in the method, the surface of weld 8 is ground flush (Fig. 6) with the surface of liner 5. The weld 8 is then of the same thickness as the liner and has the same corrosion resistance properties.

When the sealing flange 2 of the lined cover is fitted into a complementary grooved portion of the manway with which the cover is designed to be employed, the corrosive fluid contained within the vessel comes in contact with the surface of the liner 5 and with a portion of the surface of weld 8. The exposed bevelled portion of insert 7 is not exposed to corrosive fluid, however, so that the corrosion resistance properties of the insert are immaterial.

The method of the invention is highly useful and important in all applications where it is desired to fusion weld copper to a ferrous base metal. Because of the elimination of cracking and penetrators, the strength of the completed article is greatly increased and the corrosion resistance and fluid tightness of the article are correspondingly augmented.

The term "copper" as used herein includes pure copper, the commercial grades of copper known under such designations as deoxided copper, tough pitch copper, electrolytic copper and also includes alloys of copper which contain a major proportion of copper.

Various embodiments of the invention may be employed within the scope of the following claim.

I claim:

A composite metallic structure comprising a preformed carbon steel base member, a copper sheet separate from and superposed over a portion of the base member, an inlay comprising a major proportion of nickel deposited in a fused state on portions of said base member and being flush with the portion of the base member covered by the copper sheet and extending outwardly of the edge of said sheet around the periphery of the sheet to permit welding of the copper sheet to the inlay without welding to the base member, and a fusion weld of substantially the same composition as said sheet joining the copper sheet and inlay at the joint between the sheet and inlay.

References Cited in the file of this patent

UNITED STATES PATENTS

| | | |
|---|---|---|
| 1,939,467 | Short | Dec. 12, 1933 |
| 1,978,610 | Straty | Oct. 30, 1934 |
| 2,145,248 | Chace | Jan. 31, 1939 |
| 2,157,357 | Straty | May 9, 1939 |
| 2,158,799 | Larson | May 16, 1939 |
| 2,164,074 | Moses | June 27, 1939 |
| 2,174,733 | Chace | Oct. 3, 1939 |
| 2,177,868 | Chapman | Oct. 31, 1939 |
| 2,190,267 | Light | Feb. 13, 1940 |
| 2,198,331 | Chyle | Apr. 23, 1940 |
| 2,352,716 | Jones | July 4, 1944 |

FOREIGN PATENTS

| | | |
|---|---|---|
| 309,032 | Great Britain | Oct. 24, 1929 |